Figures 1, 2:
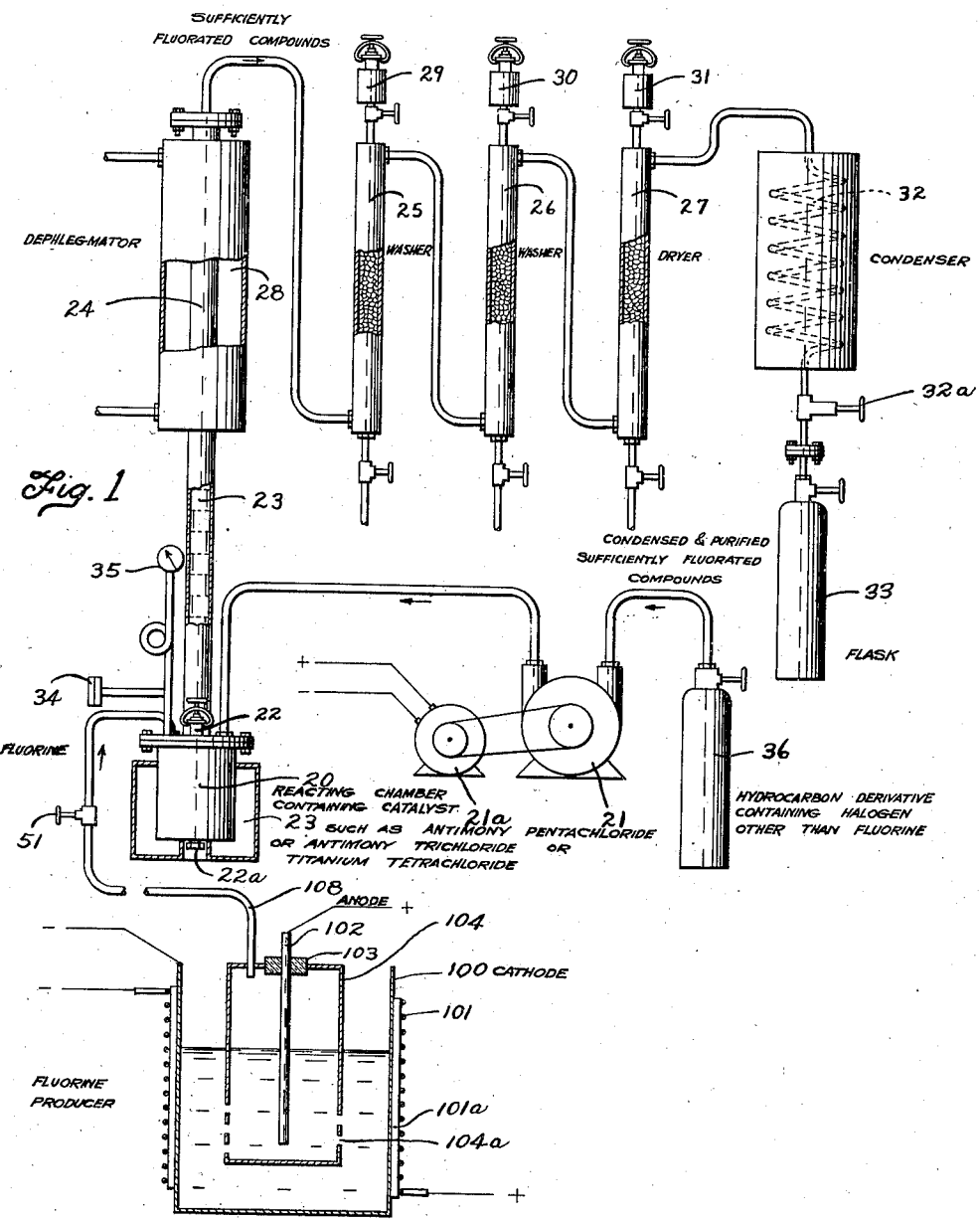

Sept. 3, 1935.   A. L. HENNE   2,013,050
FLUORATION OF ALIPHATIC HALIDES
Original Filed June 26, 1931

Albert L. Henne INVENTOR
BY
Spencer Hardman & Fehr ATTORNEYS

Patented Sept. 3, 1935

2,013,050

UNITED STATES PATENT OFFICE 2,013,050

FLUORATION OF ALIPHATIC HALIDES

Albert L. Henne, Columbus, Ohio, assignor, by mesne assignments, to General Motors Corporation, a corporation of Delaware Application June 26, 1931, Serial No. 547,159
Renewed May 19, 1934

3 Claims. (Cl. 260—162)

This invention relates to the manufacture of fluoro and/or halo-fluoro derivatives of aliphatic hydrocarbons by fluoration of aliphatic halides with fluorine.

The objects of my present invention are to provide a process or processes for the fluoration of the halo derivative or derivatives of aliphatic hydrocarbons by the use of fluorine as the fluorating agent, either with or without the aid of a catalytic agent, and more particularly to provide a process or processes for fluorating derivatives of aliphatic hydrocarbons by permitting fluorine to contact with or to pass through the halogen derivative of the hydrocarbon.

For illustrative purposes, I have disclosed apparatus for carrying out my improved process, in which Fig. 1 is a diagrammatic view of an apparatus for producing the halo-fluoro derivatives; and Fig. 2 is a diagrammatic view of one type of apparatus that may be used for the production of fluorine.

In carrying out my invention, the use of a catalytic agent is optional. It is preferred because it renders the control of the fluoration easier. If it is to be used, then the reaction chamber 20 may be supplied with the catalytic agent through the opening 22. This catalytic agent may be such a compound as antimony pentachloride, antimony trichloride, or titanium tetrachloride. An aliphatic hydrocarbon derivative is pumped from the tank 36 by the pump 21 shown diagrammatically as driven by the motor 21a, into the reaction chamber 20, while the fluorine is fed into the reaction chamber 20 through the conduit 50 under the control of the valve 51. The gaseous reaction products are separated in column 23 and dephlegmator 24. The insufficiently fluorated compounds are returned to the fluorating zone while the sufficiently fluorated compounds are discharged from the top of the dephlegmator and delivered to the washers 25 and 26 and the dryer 27. The temperature of the dephlegmator is adjusted in accordance with the pressure under which the reaction takes place so that this combination of temperature and pressure approximates the vapor pressure characteristics of the desired product. The residue may be removed from the reaction chamber 20 through the covered opening 22a.

As a specific example, dichlorodifluoromethane, is obtained from carbon tetrachloride, $CCl_4$, by fluoration. The $CCl_4$ is introduced from the supply chamber 36 into the reaction chamber 20, where it mixes with antimony pentachloride, if a catalyst is to be used. The fluorine enters the reaction chamber 20 through the conduit 50, and passes through the carbon tetrachloride. In this specific case room temperature is sufficient. The gaseous reaction products rise through the fractionating column 23 and the dephlegmator 24.

The dephlegmator temperature is maintained at about 60° F., and the pressure is maintained at about 1 atmosphere. Under these conditions I have found that dichlorodifluoromethane, $CCl_2F_2$, is obtained from the top of the dephlegmator. The dephlegmator and the column return to the reaction chamber 20 the partially fluorated compound, monofluorotrichloromethane, $CCl_3F$, and any unacted upon carbon tetrachloride, for further fluoration to the desired derivative, $CCl_2F_2$.

Although specific temperatures and pressures have been given, it should be understood that these conditions may be varied to approximate the vapor-pressure characteristics of the compound to be made. The desired pressure in the system is obtained by regulating the discharge of the finished product by manual control or by an automatic control discharge valve 32a. The washer 25 is provided with a supply of dilute aqueous solution of caustic soda from the supply chamber 29, while the washer 26 is provided with a caustic soda solution from the chamber 30. One of these washers may be used to remove the chlorine gas from the $CCl_2F_2$. The dryer 27 contains concentrated sulphuric acid supplied thereto from the supply chamber 31. Upon leaving the dryer 27, the gases may pass through the condenser 32, which may be cooled to a degree sufficient to liquefy the gas, −25° F. or lower, at atmospheric pressure. The liquefied gas is then discharged from the condenser and collected in the flask or bottle 33. A relief diaphragm 34 and pressure gauge 35 are provided.

While I have described a method of manufacturing dischlorodifluoromethane from carbon tetrachloride, it should be understood that the same final product may be obtained by the fluoration of an intermediate fluorine compound such as $CCl_3F$.

Halo-fluoro derivatives of other hydrocarbons than methane can be obtained. A chlorine derivative of ethane is introduced into the reaction chamber 20 and by contact with the fluorine entering the reaction chamber, fluoration takes place. By controlling temperature and pressure in the fractionating column 23 and the dephlegmator 24, the desired halo-fluoro derivative of the ethane is obtained.

As specific examples of the ethane derivatives, trichlorotrifluoroethane, $C_2Cl_3F_3$, is obtained by passing fluorine through a solution of hexachloroethane in difluorotetrachloroethane. The reaction chamber, as well as the dephlegmator, is maintained at a temperature of approximately 90° F. The operation is carried out at a vacuum of approximately six pounds.

By passing fluorine gas through a solution of hexachloroethane in difluorotetrachloroethane at substantially room temperature and with the dephlegmator maintained at substantially 60° F. tetrafluorodichloroethane is obtained. The operating pressure is about 1 atmosphere.

In all the specific examples set forth above, the fluorine may be obtained in any known or desired manner. However, for purposes of convenience, the fluorine may be manufactured from an apparatus substantially as that shown in Fig. 2, and may be fed directly to the reaction chamber 20. In this apparatus there is shown a tank 100, made preferably of Monel metal and heated by means of an electric resistance 101, the resistance 101 being spaced from tank 109 by means of vertical strips of insulating material 101a. A carbon electrode 102 extends downwardly through an insulator plug 103 into a fused fluoride which may be KF.HF, the plug 103 being carried by the bell 104, having its lower end perforated as at 104a. The carbon electrode constitutes the anode, while the metal container 100 constitutes the cathode, the anode and the cathode being connected into an electric circuit. The passage of electric current through the fused fluoride will cause electrolysis, wherein fluorine will be liberated and collected at the anode. This fluorine will pass through the delivery tube 108 and is fed directly to the conduit 50 and to the reaction chamber 20.

While I have disclosed specific examples illustrating my process, it should be understood that generically my invention relates to the manufacture of halo-fluoro derivatives of aliphatic hydrocarbons from halogen derivatives of such hydrocarbons by replacing one or more halogen atoms with fluorine by interacting a halogen derivative of an aliphatic hydrocarbon and fluorine, either with or without the aid of a catalyst. Further, while special conditions under which the steps of the process may be carried out have been indicated, it should be understood that these conditions are recommended conditions only.

In this application I have made numerous references to the control exercised in the specific examples because the literature statements covering sporadic attempts at fluoration with fluorine are so incomplete and often misleading as to discourage the use of fluorine for this purpose. I have found adjustments of the operating conditions which control the process so that fluorine may be used as a fluorating agent to obtain any desired product.

What is claimed is as follows:

1. The method of manufacturing a halo-fluoro derivative of an aliphatic hydrocarbon which consists in interacting in the presence of a pentavalent antimony compound a hydrocarbon derivative containing halogen other than fluorine, with fluorine, replacing at least one halogen atom of the hydrocarbon derivative with fluorine, driving off the reaction products into a dephlegmator, condensing in the dephlegmator any insufficiently fluorating compounds, returning the insufficiently fluorated compound to be further fluorated and withdrawing from the dephlegmator the sufficiently fluorated compounds.

2. The method of manufacturing a halo-fluoro derivative of methane which comprises interacting in the presence of a pentavalent antimony compound a derivative of methane containing a halogen other than fluorine, with fluorine, replacing at least one halogen atom other than fluorine, with fluorine, driving off the reaction products into a dephlegmator, condensing in the dephlegmator any insufficiently fluorated compounds, returning the condensed insufficiently fluorated compounds to be further interacted with fluorine and withdrawing from the dephlegmator the sufficiently fluorated compounds.

3. The method of manufacturing a halo-fluoro derivative of ethane which comprises interacting in the presence of a pentavalent antimony compound a derivative of ethane containing halogen other than fluorine, with fluorine, replacing at least one halogen atom other than fluorine with fluorine, driving off the reaction products into a dephlegmator, condensing in the dephlegmator the insufficiently fluorated compounds, returning from the dephlegmator the condensed insufficiently fluorated compounds to be further interacted with fluorine and withdrawing from the dephlegmator the sufficiently fluorated compounds.

ALBERT L. HENNE.